(12) United States Patent
Blair, II et al.

(10) Patent No.: US 10,532,334 B2
(45) Date of Patent: Jan. 14, 2020

(54) PAINT MIXING SYSTEM

(71) Applicant: Walmart Apollo, LLC, Bentonville, AR (US)

(72) Inventors: Richard Montgomery Blair, II, Bentonville, AR (US); William Ross Allen, Pea Ridge, AR (US); Christopher Soames Johnson, Pea Ridge, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 172 days.

(21) Appl. No.: 15/876,939

(22) Filed: Jan. 22, 2018

(65) Prior Publication Data

US 2018/0229194 A1      Aug. 16, 2018

Related U.S. Application Data

(60) Provisional application No. 62/458,645, filed on Feb. 14, 2017.

(51) Int. Cl.
*B01F 13/10* (2006.01)
*B05B 12/14* (2006.01)
(Continued)

(52) U.S. Cl.
CPC .......... *B01F 13/1063* (2013.01); *B01F 3/088* (2013.01); *B01F 15/00344* (2013.01);
(Continued)

(58) Field of Classification Search
CPC ...................... B01F 13/1063; B01F 15/00344; B01F 3/088; B01F 2215/005; B44D 3/003; B05B 12/1418
(Continued)

(56) References Cited

U.S. PATENT DOCUMENTS 5,203,387 A * 4/1993 Howlett .............. B01F 13/1055
141/102
7,099,740 B2 * 8/2006 Bartholomew ........ A45D 29/00
222/52

(Continued)

OTHER PUBLICATIONS

Nerolac Color Style—Adnroid Apps on Google Play, https://play.google.com/store/apps/details?id=com.kn.app&hl=en, last viewed Sep. 27, 2016.

(Continued)

*Primary Examiner* — Michael Collins
(74) *Attorney, Agent, or Firm* — McCarter & English, LLP; David R. Burns (57) ABSTRACT

Described in detail herein is an automated paint mixing system. The paint mixing system includes a mobile device which can receive an input associated with a color of a paint. The mobile device can transmit the input associated with a color to a first computing system. The first computing system can receive the input associated with a color. The first computing system retrieve an identifier associated with the color based on the input. The first computing system can transmit the identifier associated with the color to a second computing system. The second computing system can instruct a paint dispenser to mix and generate a specified amount of paint of the requested color based on the received identifier. The second computing system can instruct a 3-D printer to fabricate a three-dimensional container configured to store the generated paint. The paint dispenser can deposit the generated paint in the three-dimensional container.

22 Claims, 6 Drawing Sheets

(51) Int. Cl.
  *B01F 3/08* (2006.01)
  *B01F 15/00* (2006.01)
  *B44D 3/00* (2006.01)
(52) U.S. Cl.
  CPC .... *B05B 12/1418* (2013.01); *B01F 2215/005* (2013.01); *B44D 3/003* (2013.01)
(58) Field of Classification Search
  USPC ........................................................ 700/239
  See application file for complete search history.

(56) References Cited

U.S. PATENT DOCUMENTS

| | | | |
|---|---|---|---|
| 7,193,632 | B2 | 3/2007 | Rice et al. |
| 7,571,122 | B2 | 8/2009 | Howes |
| 8,150,145 | B2* | 4/2012 | Lemelin ................. G06Q 30/00 |
| | | | 382/154 |
| 8,666,540 | B2 | 3/2014 | Milhorn |
| 2006/0195369 | A1 | 8/2006 | Webb et al. |
| 2009/0112371 | A1* | 4/2009 | Hughes ................. G05D 11/132 |
| | | | 700/282 |
| 2014/0288699 | A1* | 9/2014 | Williams ................. G07F 17/26 |
| | | | 700/233 |
| 2015/0235389 | A1 | 8/2015 | Miller et al. |
| 2018/0093289 | A1* | 4/2018 | Raman ................. G05D 1/0234 |
| 2019/0031427 | A1* | 1/2019 | Dunn ..................... B65D 83/38 |
| 2019/0039309 | A1* | 2/2019 | Busbee ................. B33Y 10/00 |
| 2019/0225479 | A1* | 7/2019 | Plecis ................. B01F 13/1058 |

OTHER PUBLICATIONS

Pick-a-Paint—Android Apps on Google Play, https://play.google.com/store/apps/details?id=com.paradox.valspar.pickapaint&hl=en, last viewed Sep. 27, 2016.
ColorSmart by BEHR® Mobile—Android Apps on Google Play, https://play.google.com/store/apps/details?id=com.behr.colorsmart&hl=en, last viewed Sep. 27, 2016.

* cited by examiner

PAINT MIXING SYSTEM

CROSS-REFERENCE TO RELATED PATENT APPLICATIONS

This application claims priority to U.S. Provisional Application No. 62/458,645 filed on Feb. 14, 2017, the content of which is hereby incorporated by reference in its entirety.

BACKGROUND

Facilities may include paint mixing machines and systems. Paints of various amounts of different types of colors can be requested. Containers of different sizes can store the various amount of paints requested.

SUMMARY

In one embodiment, a paint mixing system includes a first computing system including a database. The first computing system is configured to receive an input associated with a color, retrieve an identifier associated with the color based on the input, and transmit the identifier associated with the color. The system further includes a second computing system communicatively coupled to a paint mixer, a printing device and the first computing system. The second computing system is configured to receive the identifier associated with the color, generate, via the paint mixer, a predetermined amount of paint of the color based on the identifier associated with the color, fabricate, via the printing device, a three-dimensional container configured to store the generated paint, and deposit the generated paint in the three-dimensional container.

In one embodiment, a paint mixing method includes receiving, via a first computing system that includes a database, an input associated with a color, retrieving, via the first computing system, an identifier associated with the color based on the input and transmitting, via the first computing system, the identifier associated with the color to a second computing system. The method further includes receiving, via a second computing system that is communicatively coupled to a paint mixer, a printing device and the first computing system, the identifier associated with the color, generating, via the paint mixer of the second computing system, a predetermined amount of paint of the color based on the identifier associated with the color, fabricating, via the printing device of the second computing system, a three-dimensional container configured to store the generated paint and depositing, via the second computing system, the generated paint in the three-dimensional container.

In one embodiment, a paint mixing system includes a computing system including a database that is communicatively coupled to a paint mixer and a printing device. The computing system is configured to receive an input associated with a color, retrieve an identifier associated with the color based on the input, generate, via the paint mixer, a predetermined amount of paint of the color based on the identifier associated with the color, fabricate, via the printing device, a three-dimensional container configured to store the generated paint, and deposit the generated paint in the three-dimensional container.

BRIEF DESCRIPTION OF THE FIGURES

Illustrative embodiments are shown by way of example in the accompanying figures and should not be considered as a limitation of the present disclosure. The accompanying figures, which are incorporated in and constitute a part of this specification, illustrate one or more embodiments of the invention and, together with the description, help to explain the invention, in the figures.

DETAILED DESCRIPTION

Described in detail herein is an automated paint mixing system. The paint mixing system includes a mobile device which can receive an input associated with a color of a paint. The mobile device can capture the color using an image capturing device coupled to the mobile device. Alternatively, the mobile device can receive alphanumeric input associated with the color. The mobile device can transmit the input associated with the color to a first computing system. The first computing system can receive the input associated with the color. The first computing system can query the colors database to retrieve an identifier associated with the color based on the input. The first computing system can transmit the identifier associated with the color to a second computing system. The second computing system can receive the identifier. The second computing system can instruct a paint dispenser to mix and generate a specified amount of paint of the requested color based on the received identifier. The second computing system can instruct a 3-D printer to fabricate a three-dimensional container configured to store the generated paint. The paint dispenser can deposit the generated paint in the three-dimensional container. The disclosed system improves the current technology in the art by dynamically generating customized sizes of paint containers based on the determined amount of paint requested.

Figure 1A:
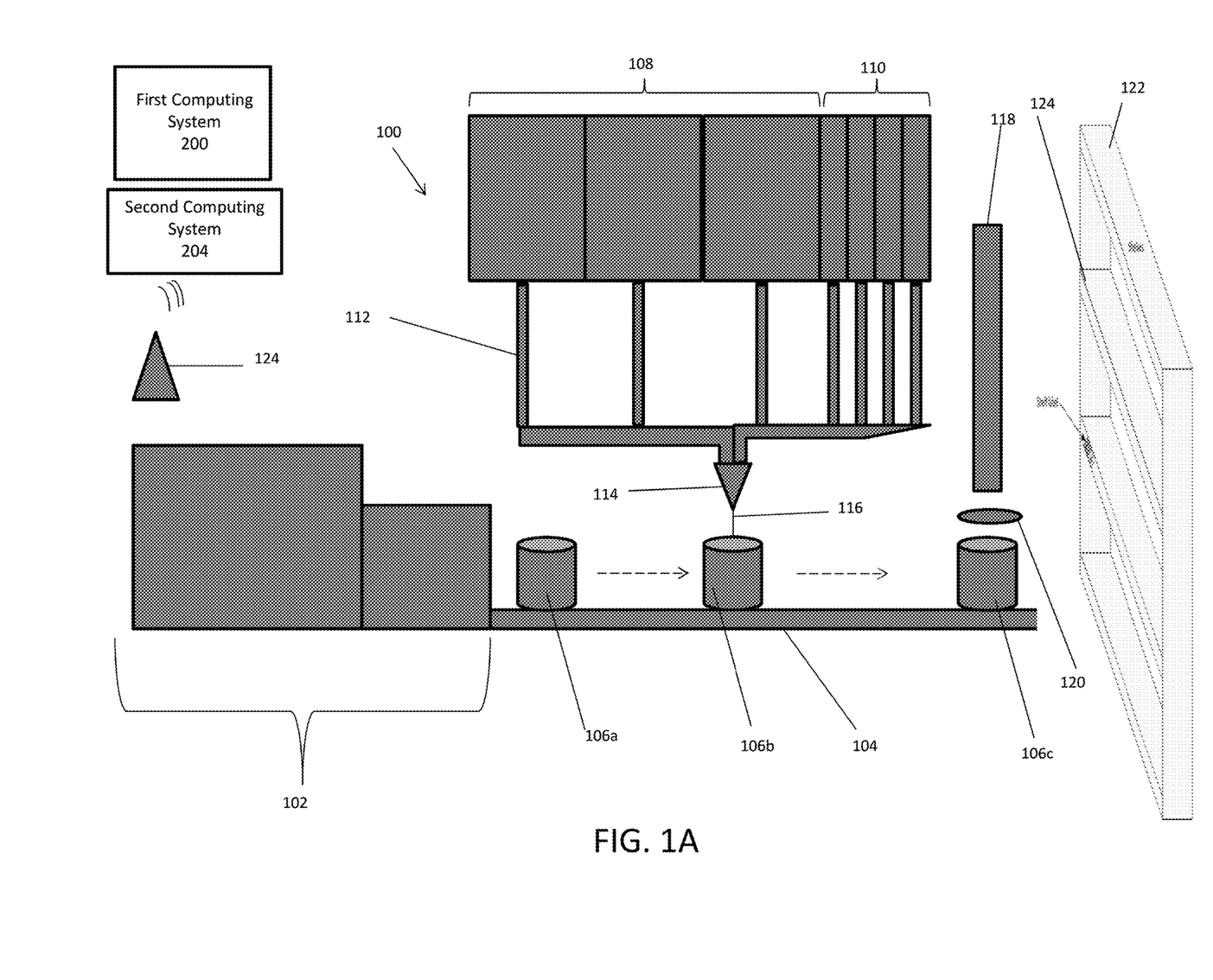
FIG. 1A is a block diagram of a paint mixing system in accordance with an exemplary embodiment.

FIG. 1A is a block diagram of a paint mixing system in accordance with an exemplary embodiment. In the exemplary embodiment, a paint mixing system 100 can include a 3-D printer 102, a conveyer belt 104, base paint dispensers 108, pigment dispensers 110 and a lid dispenser 118. The conveyer belt 104 can be coupled to the 3-D printer 102. The base paint dispensers 108, pigment dispensers 110 and the lid dispenser 118 can be disposed above the 3-D printer 102 and the conveyer belt 104. A storage unit 122 can be disposed adjacent to the conveyer belt 104. The storage unit 122 can be a locker unit or a shelving unit to store filled paint containers.

In exemplary embodiments, the paint mixing system 100 (i.e. the 3-D printer 102, the conveyer belt 104, the base paint dispensers 108, the pigment dispensers 110 and the lid dispenser 118) can be included in a second computing system 204. The second computing system 204 can communicate with a first computing system 200, via a wireless access point 124. The first computing system 200 and the second computing system will be further discussed in detail with reference to FIG. 2.

The paint mixing system 100 can receive instructions to generate a paint of a requested color and amount and generate a paint container for depositing the generated paint of the requested color and amount. The 3-D printer 102 can be configured to fabricate a paint container of a specified size based on the requested amount of paint. The 3-D printer 102 can place the completed fabricated paint containers 106a-c on the conveyer belt 104. The conveyer belt 104 can transport the paint containers 106a-c towards the base paint and pigment dispensers 108 and 110. For example, the base paint dispensers 108 can include and store the base colors. The pigment dispensers 110 can include and store multiple pigments. The base paint dispensers 108 and the pigment dispensers 110 can be connected to a mixing funnel device 114 through various tubes 112. The base paint dispensers 108 and pigment dispensers 110 can dispense the base paints and pigments (respectively) through the tubes 112 based on the requested color and requested quantity. The base paints and pigments can meet in the mixing funnel device 114. The mixing funnel device 114 can mix the base paints and pigments to generate the paint of a requested color and dispense the paint 116 in the paint container 106b disposed under the mixing funnel device 114, on the conveyer belt 104. The paint container 106c can be transported to under the lid dispenser 118. The lid dispenser 118 can house paint container lids of various sizes. The lid dispenser 118 can detect a paint container disposed underneath it, on the conveyer belt 104. The lid dispenser 118 can retrieve a lid 120 and secure the lid on the paint container 106c. The lid dispenser can retrieve the correct sized lid 120 for the paint container 106c based on the requested quantity of paint. In some embodiments, a sample of the paint color inside the lid can be placed on the lid. The paint container can also be shaken to mix the paint inside the paint container. The paint containers 106a-c can be transported from the conveyer belt 104 to the storage unit 122. As mentioned above, the storage unit 122 can be a shelving unit or a locker unit.

In an alternative embodiment, the paint mixing system 100 can include a paint buffer. The paint buffer 103 can store paint containers of various sizes. The paint buffer can be coupled to the conveyer belt 104. The paint buffer can receive instructions from the computing system 200 to dispense a paint container of a specified size onto the conveyer belt 104.

Figure 1B:
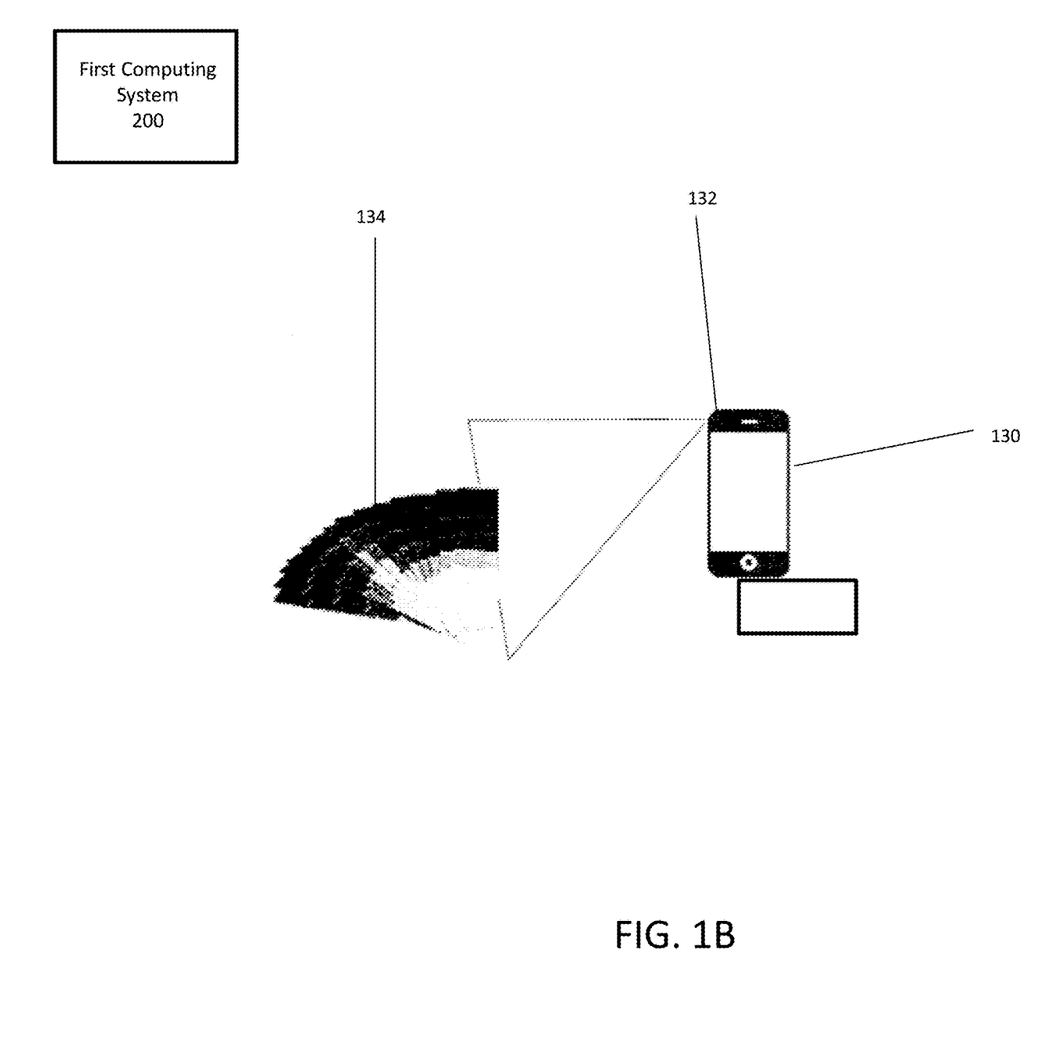
FIG. 1B is a block diagram of a mobile device selecting a color of a paint in accordance with an exemplary embodiment.

FIG. 1B is a block diagram of a mobile device selecting a color of a paint in accordance with an exemplary embodiment. A user can request a paint of a color and quantity using a mobile device 130. The mobile device 130 can include an image capturing device 132. The image capturing device 132 can be configured to capture an image of a desired color. For example, the image capturing device 132 can capture an image of various color swatches 124. The image capturing device 132 can capture an image of any physical object of any color. The mobile device 130 can transmit the captured image of a physical object (i.e. color swatches 134) to a first computing system 200. The first computing system 200 will be discussed in further detail with reference to FIG. 2.

The mobile device 130 can also capture an image of a physical area using the image capturing device 132. The physical area can be the area on which the user would like the paint to be applied. For example, the mobile device 130 can capture image(s) walls of a room or different areas of a physical object. The mobile device 130 can transmit the captured image(s) to the first computing system 200. The first computing system 200 can determine the amount of paint needed based on the amount of area in the images, as will be described herein. The mobile device 130 can be a mobile phone, a portable digital assistant, a laptop computer, a tablet device, or a wireless portable device. The image capturing device 132 can capture moving or still images.

Figure 1C:
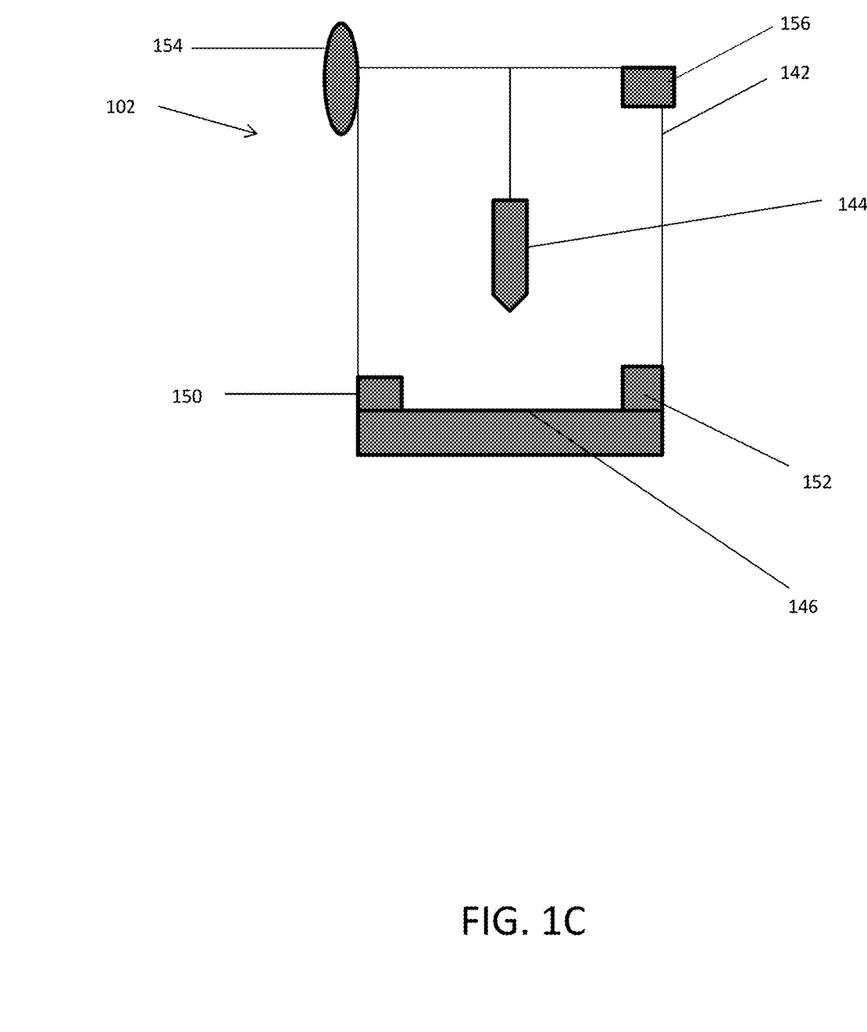
FIG. 1C is a block diagram of a 3-D printer in accordance with an exemplary embodiment.

FIG. 1C is a block diagram of a 3-D printer in accordance with an exemplary embodiment. The 3-D printer 102 can include an extruder 144 disposed above a print bed 146. The extruder 142 can be secured to a frame 142 and a filament 154 can be secured to the frame 142. The filament 154 can include the plastic (and/or other materials) consumed by the printer to fabricate the physical object. The filament 154 can come in a spool. One or more motors to control the motion of the extruder 142 can be coupled to the frame 142. A controller 150 and a power source can also be coupled to the printing bed 146. The controller 150 can control the operations of the one or more motors 156 and extruder 142.

The controller 150 can receive instructions to fabricate a physical object of a specified size. The controller 150 can control the extruder 142 and frame 142 to fabricate the physical object. The extruder 142 can pull in the material from the filament 154 and dispense the material on the print bed 146. In some embodiments the material can be plastic and the extruder can melt the plastic before dispensing the material on the print bed 146. The extruder 142 can include a motor, fan, hobbered gear, heat sink, thermistor, heating block, and a nozzle. The material can be dispensed through the nozzle.

The controller 150 can control the one or more motors 156 to control the motion of the extruder 142 to generate the shape of the physical object on the print bed. The one or more motors 156 can move the extruder 142 along the X, Y and Z axis. Alternatively, the extruder 142 can be suspended using three arms, and the arms can move along the X, Y and Z axis at different rates. The physical object can be generated on the print bed 146. The print bed 146 can be heated. Alternatively, the print bed 146 is not heated.

Figure 2:
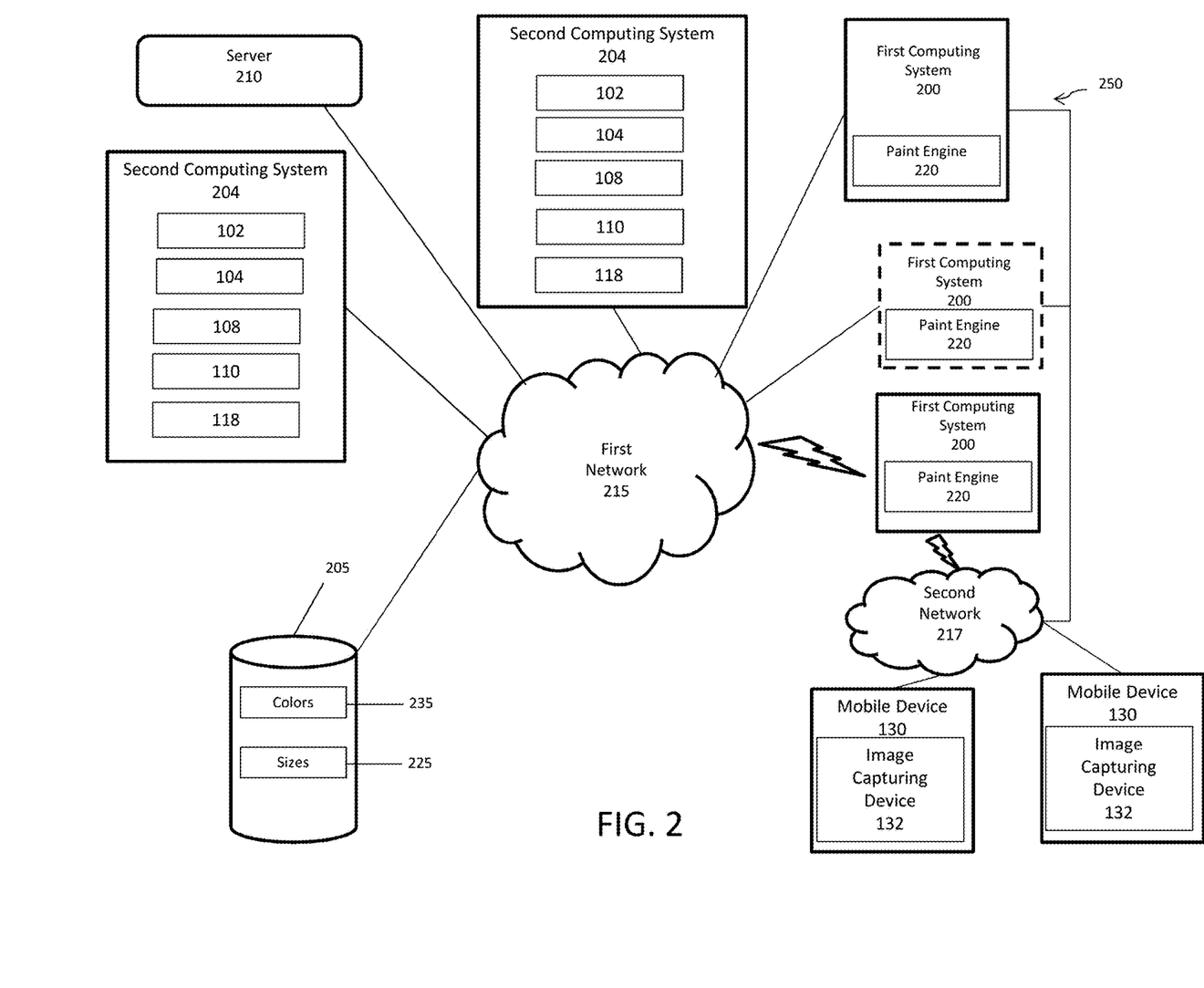
FIG. 2 is a block diagram illustrating an automated paint mixing system according to an exemplary embodiment.

FIG. 2 illustrates an exemplary automated paint mixing system in accordance with an exemplary embodiment. The automated paint mixing system 250 can include one or more databases 205, one or more first computing systems 200, one or more second computing system 204 and mobile devices 130. As mentioned above, the second computing system 204 can include the 3-D printer 102, the conveyer belt 104, the base paint dispensers 108, the pigment dispensers 110 and the lid dispenser 118. The first computing system 200 can be in communication with the databases 205, the second computing system 204 via a first communications network 215. The first computing system 200 can be in communication with the mobile devices 130 via a second communications network 217. The mobile devices 130 can include an image capturing device 134. The image capturing device 134 can be configured to capture still or moving images.

The first computing system 200 can implement at least one instance of a paint engine 220. The paint engine 220 can be an executable application executed on the first computing system 200. The paint engine can execute the process of the paint mixing system 250 as described herein.

In an example embodiment, one or more portions of the first and second communications network 215, 217 can be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

The first computing system 200 includes one or more computers or processors configured to communicate with the databases 205, and the second computing system 204 via the first network 215. The first computing system 200 hosts one or more applications configured to interact with one or more components of the automated paint mixing system 250. The databases 205 may store information/data, as described herein. For example, the databases 205 can include color information database 235 sizes information database 225. The color information database 235 can store information associated with color pigments. The sizes information database 225 can include information associated with amount of paint needed for sizes of physical areas. The databases 205, the first computing system 200 and the second computing system 204, can be located at one or more geographically distributed locations from each other. Alternatively, the databases 205 can be included within first computing system 200.

In exemplary embodiments, the first computing system 200 can receive a request from a mobile device 130 for a paint of a desired quantity and color. For example, the mobile device 130 can capture an image using the image capturing device 134, of a requested color and transmit the image to the first computing system 200. The request can include one or more images of a requested color and one or more images of an area to be painted. Alternatively, the request can include alphanumeric input regarding the color and the amount of paint requested. The first computing system 200 can execute the paint engine 220 in response to receiving the request.

The paint engine 220 can extract the color from the one or more images of the requested color. The paint engine 220 can extract the size and/or dimensions of the area to be painted. The paint engine 220 can use video analytics and/or machine vision to extract the color and size and/or dimensions from the images. The paint engine 220 can query the color database 235 to retrieve an identifier of the color extracted from the one or more images. The paint engine 220 can query the sizes database 225 to retrieve the amount of paint needed based on the size and/or dimensions of the physical area to be painted, extracted from the one or more images. The paint engine 220 can determine the amount and size of paint containers needed based on the retrieved amount of paint. The paint engine 220 can transmit the identifier and the determined amount of paint needed to the second computing system 204.

The second computing system 204 can instruct the 3-D printer 102 to fabricate an amount of paint containers of specified sizes based on the determined amount and size of paint containers needed. The 3-D printer 102 can place the fabricated paint containers on the conveyer belt 102. The second computing system 204 can operate the conveyer belt 104 to transport the paint container to the base paint dispensers 108 and the pigment dispensers 110. The second computing system 204 can instruct the base paint dispensers 108 and the pigment dispensers 110 to mix and dispense paint of a specified quantity into the paint containers fabricated by the 3-D printer 102. The base paint dispensers 108 and the pigment dispensers 110 can mix and dispense the paint of the requested amount and color. The second computing system 204 can instruct the lid dispenser 118 to secure a lid to the paint container. The paint container can be placed in a storage unit (as shown in FIG. 1A). The second computing system 204 can transmit a signal to the paint engine 220 indicating the fulfillment of the paint request. The paint engine 220 can transmit an alert to the mobile device 130 alerting the fulfillment of the paint request. In some embodiments, the alert can include the location of the storage unit and the location of the paint container(s) requested on the shelving unit (i.e. locker number and/or combination).

In some embodiments, the first computing system 200 can directly communicate with the 3-D printers 102, base paint dispensers 108, the conveyer belt 104, the pigment dispensers 110 and the lid dispenser 118. The first computing system 200 can receive a request for a paint of a requested amount and color. The first computing system 200 can determine the amount of paint requested and an identifier associated with the color of the paint requested. The first computing system 200 can instruct the 3-D printer 240 to fabricate a specified quantity of paint containers of a specified size based on the quantity of paint requested. The paint engine 220 can instruct the conveyer belt 104 to transport the paint container to the base paint dispensers 108 and the pigment dispensers 110. The first computing system 200 can instruct the base paint dispensers 108 and the pigment dispensers 110 to mix and dispense paint of a specified color and a specified amount in the paint containers. The first computing system 200 can instruct the lid dispenser 118 to secure a lid on the paint container.

As a non-limiting example, the automated paint mixing system 250 can be implemented in a retail store. A customer can transmit an order for a request for a paint of a specified quantity and color, via the mobile device 130. The first computing system 200 can receive the request from a mobile device 130 of the customer, for a paint of a specified quantity and color. The request can include one or more images of a requested color and one or more images of an area needed to be painted. Alternatively, the request can include alphanumeric input regarding the color and the amount of paint needed. The first computing system 200 can execute the paint engine 220 in response to receiving the request.

The paint engine 220 can extract the color from the one or more images of the requested color. The paint engine 220 can extract the size and/or dimensions of the area to be painted from the images included in the request. The paint engine 220 can use video analytics and/or machine vision to extract the color and size and/or dimensions from the images. The paint engine 220 can query the color database 235 to retrieve an identifier of the color extracted from the one or more images. The paint engine 220 can query the sizes database 225 to retrieve the amount of paint needed based on the size and/or dimensions of the physical area to be painted, extracted from the one or more images. The paint engine 220 can determine the amount and size of paint containers needed based on the retrieved amount of paint. The paint engine 220 can transmit the identifier and the determined amount of paint requested to the second computing system 204.

The second computing system 204 can instruct the 3-D printer 102 to fabricate an amount of paint containers of specified sizes based on the determined amount and size of paint containers needed. The 3-D printer 102 can place the fabricated paint containers on the conveyer belt 102. The second computing system 204 can operate the conveyer belt 104 to transport the paint container to the base paint dispensers 108 and the pigment dispensers 110. The second computing system 204 can instruct the base paint dispensers 108 and the pigment dispensers 110 to mix and dispense paint of a specified quantity into the paint containers fabricated by the 3-D printer. The base paint dispensers 108 and the pigment dispensers 110 can mix and dispense the paint of the requested amount and color. The second computing system 204 can instruct the lid dispenser 118 to secure a lid to the paint container. The paint container can be placed in a storage unit (as shown in FIG. 1A). The second computing system 204 can transmit a signal to the paint engine 220 indicating the fulfillment of the paint request. The paint engine 220 can transmit an alert to the mobile device 130 of the customer alerting the fulfillment of the paint order. In some embodiments, the alert can include the location of the storage unit and the location of the paint container(s) requested on the shelving unit (i.e. locker number and/or combination).

Figure 3:
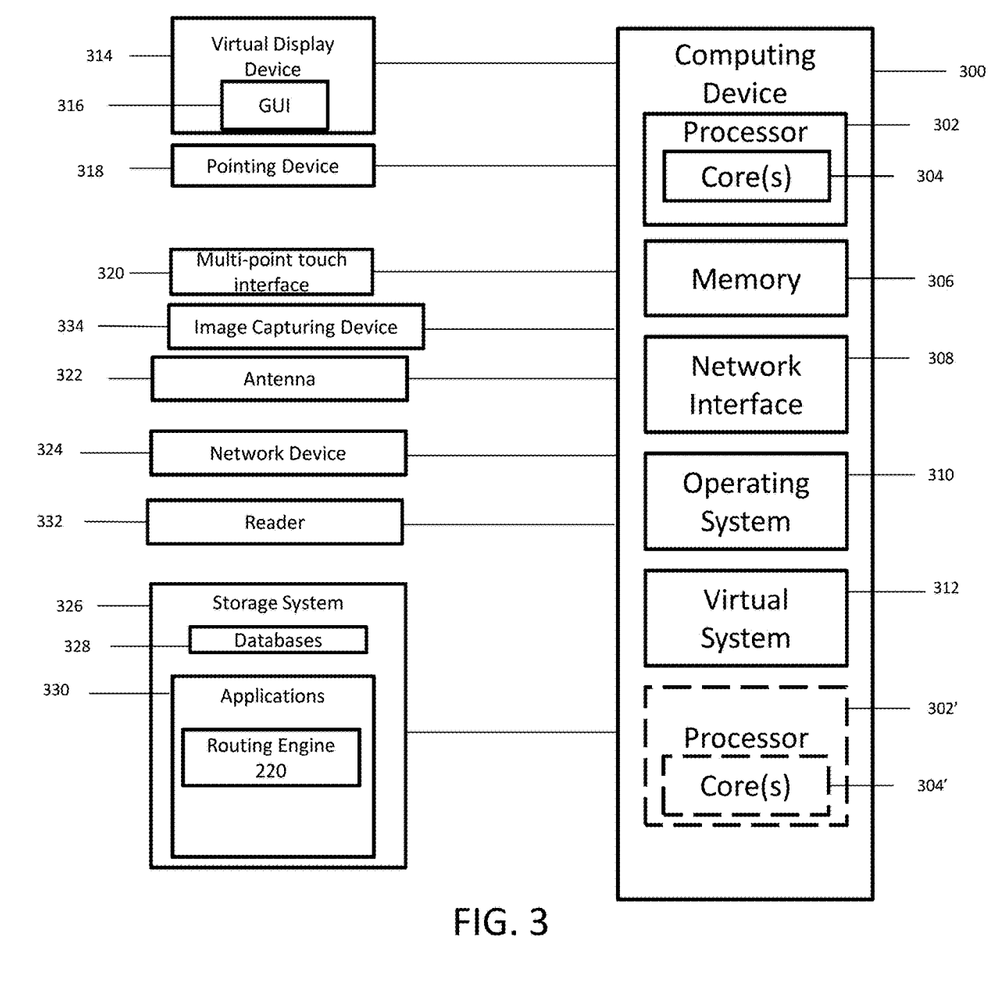
FIG. 3 is a block diagram illustrating an exemplary computing device in accordance with an exemplary embodiment.

FIG. 3 is a block diagram of an example computing device for implementing exemplary embodiments of the present disclosure. Embodiments of the computing device 300 can implement embodiments of the automated paint mixing system. The computing device 300 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives, one or more solid state disks), and the like. For example, memory 306 included in the computing device 300 may store computer-readable and computer-executable instructions or software (e.g., applications 330 such as the paint engine 220) for implementing exemplary operations of the computing device 300. The computing device 300 also includes configurable and/or programmable processor 302 and associated core(s) 304, and optionally, one or more additional configurable and/or programmable processor(s) 302' and associated core(s) 304' (for example, in the case of computer systems having multiple processors/cores), for executing computer-readable and computer-executable instructions or software stored in the memory 306 and other programs for implementing exemplary embodiments of the present disclosure. Processor 302 and processor(s) 302' may each be a single core processor or multiple core (304 and 304') processor. Either or both of processor 302 and processor(s) 302' may be configured to execute one or more of the instructions described in connection with computing device 300.

Virtualization may be employed in the computing device 300 so that infrastructure and resources in the computing device 300 may be shared dynamically. A virtual machine 312 may be provided to handle a process running on multiple processors so that the process appears to be using only one computing resource rather than multiple computing resources. Multiple virtual machines may also be used with one processor.

Memory 306 may include a computer system memory or random access memory, such as DRAM, SRAM, EDO RAM, and the like. Memory 406 may include other types of memory as well, or combinations thereof. The computing device 300 can receive data from input/output devices such as, a reader 332 and an image capturing device 334. The image capturing device 334 can capture still or moving images. A user may interact with the computing device 300 through a visual display device 314, such as a computer monitor, which may display one or more graphical user interfaces 316, multi touch interface 320 and a pointing device 318.

The computing device 300 may also include one or more storage devices 326, such as a hard-drive, CD-ROM, or other computer readable media, for storing data and computer-readable instructions and/or software that implement exemplary embodiments of the present disclosure (e.g., applications such as the control engine 220). For example, exemplary storage device 326 can include one or more databases 328 for storing information color pigments and amount of paint needed for painting physical areas. The databases 328 may be updated manually or automatically at any suitable time to add, delete, and/or update one or more data items in the databases. The databases 328 can include information associated with physical objects disposed in the facility and the locations of the physical objects.

The computing device 300 can include a network interface 308 configured to interface via one or more network devices 324 with one or more networks, for example, Local Area Network (LAN), Wide Area Network (WAN) or the Internet through a variety of connections including, but not limited to, standard telephone lines, LAN or WAN links (for example, 802.11, T1, T3, 56kb, X.25), broadband connections (for example, ISDN, Frame Relay, ATM), wireless connections, controller area network (CAN), or some combination of any or all of the above. In exemplary embodiments, the computing system can include one or more antennas 322 to facilitate wireless communication (e.g., via the network interface) between the computing device 300 and a network and/or between the computing device 300 and other computing devices. The network interface 308 may include a built-in network adapter, network interface card, PCMCIA network card, card bus network adapter, wireless network adapter, USB network adapter, modem or any other device suitable for interfacing the computing device 300 to any type of network capable of communication and performing the operations described herein.

The computing device 300 may run any operating system 310, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, or any other operating system capable of running on the computing device 300 and performing the operations described herein. In exemplary embodiments, the operating system 310 may be run in native mode or emulated mode. In an exemplary embodiment, the operating system 310 may be run on one or more cloud machine instances.

Figure 4:
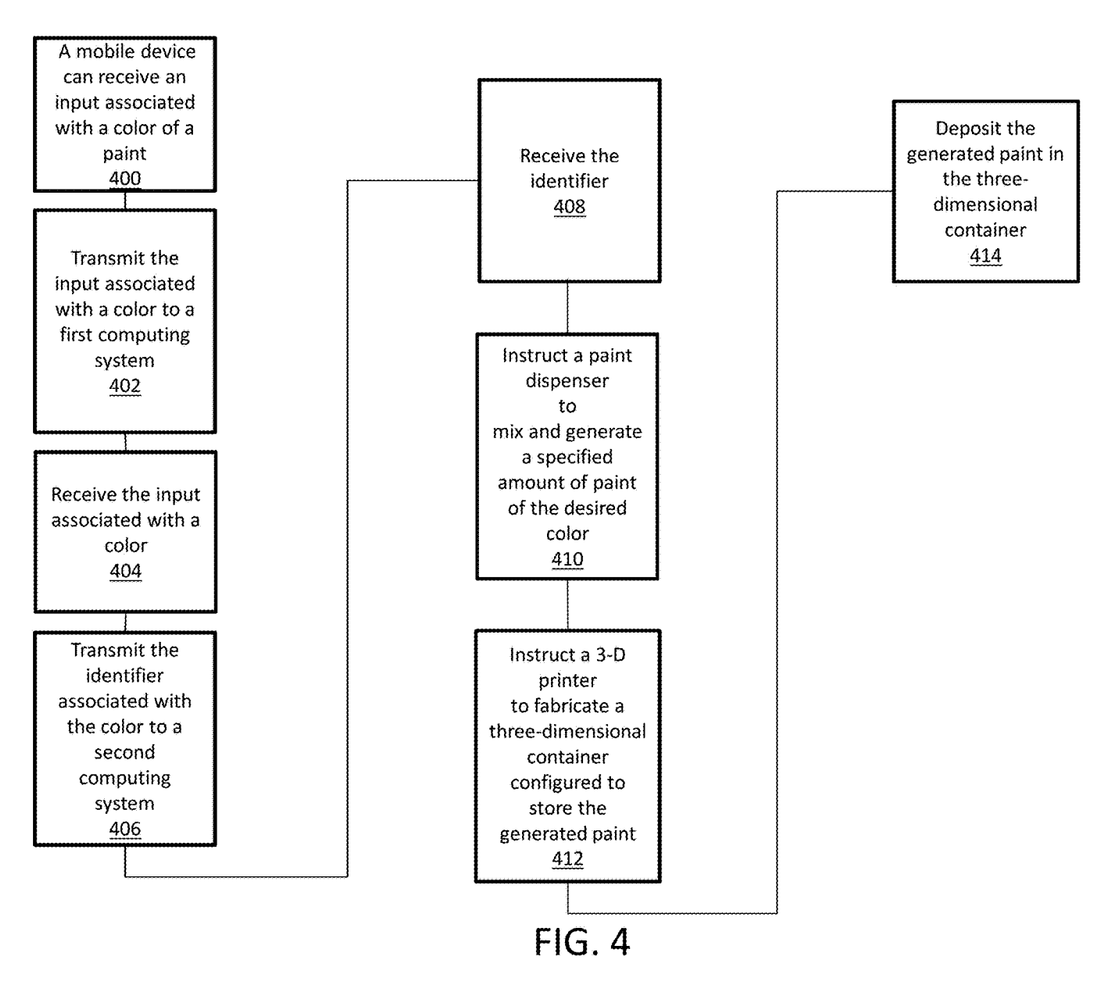
FIG. 4 is a flowchart illustrating an exemplary process in accordance with an exemplary embodiment.

FIG. 4 is a flowchart illustrating the automated paint mixing process according to exemplary embodiment. In operation 400, a mobile device (e.g. mobile device 130 as shown in FIGS. 1B and 2) can receive an input associated with a color of a paint. The mobile device can capture a color using an image capturing a device (e.g. image capturing device 132 as shown in FIG. 1B and 2) coupled to the mobile device. Alternatively, the mobile device can receive alpha-numeric input associated with the color. In operation 402, the mobile device can transmit the input associated with a color to a first computing system (e.g. first computing system 200 as shown in FIG. 2). In operation 404, the first computing system can receive the input associated with a color. The first computing system can query the colors database (e.g. colors database 235 as shown in FIG. 2) to retrieve an identifier associated with the color based on the input. In operation 406, the first computing system can transmit the identifier associated with the color to a second computing system (e.g. second computing system 204 as shown in FIG. 2). In operation 408, the second computing system can receive the identifier. In operation 410, the second computing system can instruct a base paint dispenser (e.g. base paint dispenser 108 as shown in FIGS. 1A and 2) and the pigment dispenser (e.g. pigment dispenser 110 as shown in FIGS. 1A and 2) to mix and generate a specified amount of paint of the requested color based on the received identifier. In operation 412, the second computing system can instruct a 3-D printer (e.g. 3-D printer 102 as shown in FIGS. 1A, 1C and 2) to fabricate a three-dimensional container configured to store the generated paint. In operation 414, the base paint dispenser and the pigment dispenser can deposit the generated paint in the three-dimensional container.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a multiple system elements, device components or method steps, those elements, components or steps may be replaced with a single element, component or step. Likewise, a single element, component or step may be replaced with multiple elements, components or steps that serve the same purpose. Moreover, while exemplary embodiments have been shown and described with references to particular embodiments thereof, those of ordinary skill in the art will understand that various substitutions and alterations in form and detail may be made therein without departing from the scope of the present disclosure. Further still, other aspects, functions and advantages are also within the scope of the present disclosure.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

We claim:

1. A paint mixing system, the system comprising:
   a first computing system including a database, the first computing system configured to:
     receive an input associated with a color,
     retrieve an identifier associated with the color based on the input, and
     transmit the identifier associated with the color; and
   a second computing system communicatively coupled to a paint mixer, a printing device and the first computing system, the second computing system configured to:
     receive the identifier associated with the color,
     generate, via the paint mixer, a predetermined amount of paint of the color based on the identifier associated with the color,
     fabricate, via the printing device, a three-dimensional container configured to store the generated paint, and
     deposit the generated paint in the three-dimensional container.

2. The system of claim 1, further comprising a mobile device communicatively coupled to the first computing system, configured to execute a paint selection module that when executed receives the input associated with the color and transmits the input associated with the color to the first computing system.

3. The system of claim 2, wherein the input associated with the color of the paint includes dimensions of a physical space.

4. The system of claim 3, wherein the first computing system is further programmed to:
   calculate the predetermined amount of paint based on the dimensions of the physical space; and
   transmit the predetermined amount of paint to the second computing system.

5. The system of claim 4, wherein the second computing system is further programmed to:
   determine a size of the paint container large enough to store the predetermined amount of paint;
   fabricate the paint container, via the printing device, of the determined size.

6. The system of claim 1, further comprising:
   a lid securing device operatively coupled to the second computing system and configured to secure a lid on the paint container.

7. The system of claim 6, wherein second computing system is further configured to print a sample of the color of the paint deposited in the paint container and affix the sample to a top surface of the lid secured to the paint container.

8. The system of claim 2, wherein the input is alphanumeric or an image.

9. The system of claim 2, wherein the mobile device includes an image capturing device and the input is an image of a physical object.

10. The system of claim 9, wherein the first computing system is further programmed to:
    receive the image of the physical object;
    determine a color of the physical object;
    retrieve an identifier associated with the color; and
    transmit the identifier associated with the color to the second computing system.

11. The system of claim 10, wherein the first computing system uses video analytics or machine vision to determine the color of the physical object.

12. A paint mixing method, the method comprising:
    receiving, via a first computing system that includes a database, an input associated with a color;
    retrieving, via the first computing system, an identifier associated with the color based on the input;
    transmitting, via the first computing system, the identifier associated with the color to a second computing system;
    receiving, via a second computing system that is communicatively coupled to a paint mixer, a printing device and the first computing system, the identifier associated with the color;
    generating, via the paint mixer of the second computing system, a predetermined amount of paint of the color based on the identifier associated with the color;
    fabricating, via the printing device of the second computing system, a three-dimensional container configured to store the generated paint; and
    depositing, via the second computing system, the generated paint in the three-dimensional container.

13. The method of claim 12, further comprising:
    receiving, via a mobile device communicatively coupled with the first computing system, the input associated with the color; and
    transmitting, via the mobile device, the input associated with the color.

14. The method of claim 13, wherein the input associated with the color of the paint includes dimensions of a physical space.

15. The method of claim 14, further comprising:
    calculating, via the first computing system, the predetermined amount of paint based on the dimensions of the physical space; and transmitting, via the first computing system, the predetermined amount of paint to the second computing system.

16. The method of claim 15, further comprising:
determining, via the second computing system, a size of the paint container large enough to store the predetermined amount of paint; and
fabricating, via the printing device of the second computing system, the paint container, of the determined size.

17. The method of claim 12, further comprising:
securing a lid on the paint container using a lid securing device operatively coupled to the second computing system.

18. The method of claim 17, further comprising:
printing, via the second computing system, a sample of the color of the paint deposited in the paint container; and
affixing, via the second computing system, the sample to a top surface of the lid secured to the paint container.

19. The method of claim 13, wherein the input is alphanumeric or an image.

20. The method of claim 13, further comprising:
capturing, via an image capturing device operatively coupled to the mobile device, an image of an physical object; and
transmitting, via the mobile device, the image to the first computing system.

21. The method of claim 20, further comprising:
receiving, via the first computing system, the image of the physical object;
determining, via the first computing system, a color of the physical object;
retrieving, via the first computing system, an identifier associated with the color; and
transmitting, via the first computing system, the identifier associated with the color to the second computing system.

22. A paint mixing system, the system comprising:
a computing system including a database that is communicatively coupled to a paint mixer and a printing device, the computing system is configured to:
receive an input associated with a color,
retrieve an identifier associated with the color based on the input;
generate, via the paint mixer, a predetermined amount of paint of the color based on the identifier associated with the color,
fabricate, via the printing device, a three-dimensional container configured to store the generated paint, and
deposit the generated paint in the three-dimensional container.

* * * * *